INVENTOR.
ARNOLD L. ANDZER
BY
Martin L. Kacher
ATTORNEY

MULTIBAND RADIO FREQUENCY TUNER-AMPLIFIER

Filed Oct. 4, 1966

INVENTOR.
ARNOLD L. ANDZER
BY
[signature]
ATTORNEY

MULTIBAND RADIO FREQUENCY TUNER-AMPLIFIER

INVENTOR.
ARNOLD L. ANDZER
BY
[signature]
ATTORNEY

INVENTOR.
ARNOLD L. ANDZER
BY
ATTORNEY

MULTIBAND RADIO FREQUENCY TUNER-AMPLIFIER

Filed Oct. 4, 1966

INVENTOR.
ARNOLD L. ANDZER

BY

Martin Lukacher

ATTORNEY

MULTIBAND RADIO FREQUENCY TUNER-AMPLIFIER

Filed Oct. 4, 1966

INVENTOR.
ARNOLD L. ANDZER
BY
ATTORNEY

INVENTOR.
ARNOLD L. ANDZER
BY
Martin L. Kach
ATTORNEY

March 11, 1969 A. L. ANDZER 3,432,760

MULTIBAND RADIO FREQUENCY TUNER-AMPLIFIER

Filed Oct. 4, 1966

INVENTOR.
ARNOLD L. ANDZER

BY [signature]

ATTORNEY

United States Patent Office 3,432,760
Patented Mar. 11, 1969

3,432,760

MULTI-BAND RADIO FREQUENCY TUNER-AMPLIFIER

Arnold L. Andzer, Rochester, N.Y., assignor to General Dynamics Corporation, a corporation of Delaware Filed Oct. 4, 1966, Ser. No. 584,201
U.S. Cl. 325—452 9 Claims
Int. Cl. H04b *1/16;* H03j *5/02*

ABSTRACT OF THE DISCLOSURE

A radio frequency amplifier and tuner for a multiband radio is composed of a plurality of multi-layer printed circuit boards. A plurality of tuned circuits are located on stator printed circuit boards and amplifier circuits are located on rotor printed circuit boards; the rotor boards are rotated with respect to the stator boards so as to connect one of the tuned circuits on a stator board to an amplifier circuit on a rotor board.

The present invention relates to tunable electronic circuits, and particularly to a tuner-amplifier for a multiband radio set.

Although the invention is generally useful in tuning electronic circuits, it is particularly useful in the radio frequency circuits of multiband radio transceivers.

Modern radio communications systems have requirements for both miniaturization and a broad frequency range of operation, for example, covering the high frequency band and portions of the very high frequency band. These requirements are ordinarily incompatible with each other. Tuned circuits which are used in radio frequency amplifiers and tuners are only effective over a limited range. Thus, the use of a multiplicity of such tuned circuits is ordinarily necessitated. Each circuit requires a finite amount of space. No less space consuming are the switching devices for making connections to the desired tuned circuit. In the radio frequency range, the tuned circuits must be isolated to prevent coupling therebetween. Such circuit isolation ordinarily is accomplished at the expense of space to accommodate shielding.

It is therefore an object of the present invention to provide an improved radio-frequency tuner amplifier having electrical and mechanical parameters which complement each other to obtain wide range operation in a miniaturized package.

It is a further object of the present invention to provide an improved radio-frequency amplifier-tuner which is adapted for digital tuning.

It is a still further object of the present invention to provide an improved radio frequency amplifier-tuner which is mechanically sturdy and is adaptable for mobile communications use, as in portable transceivers.

It is a still further object of the present invention to provide an improved multiband radio frequency amplifier-tuner wherein each tuning band is independent of the others so that a failure in one band does not preclude operability in others, thereby providing more reliable operation.

It is a still furthert object of the present invention to provide an improved radio frequency amplifier-tuner in which the various components are accessible for improved maintainability.

It is a still further object of the present invention to provide an improved radio frequency amplifier-tuner which is substantially independent of variations in stray inductance and capacitance and thus in undesired meandering (viz unwanted cross-coupling) of signals.

Briefly described, a tuner embodying the invention includes a radio frequency amplifier circuit, the components of which are mounted on one side of a first printed circuit board. A second printed circuit board provides a mounting for a plurality of tuned circuits. This second board may be fixedly mounted as a stator and the first board journaled thereon for rotation in a plane parallel thereto. The first board may therefore be called a rotor board. The opposed sides of the boards contain contact elements and printed circuit connections which may be selectively engaged to tune the radio frequency amplifier to different bands. The several tuned circuits are connectable in the amplifier by rotating the rotor board. A stack of such boards has small space requirements. Two side-by-side rotor boards may be provided for each stator board. Thus, a multiplicity of bands may be covered by the amplifier-tuner.

The invention itself, both as to its organization and method of operation, as well as additional objects and advantages thereof will become more readily apparent from a reading of the following description in connection with the accompanying drawings in which.

Figure 12:
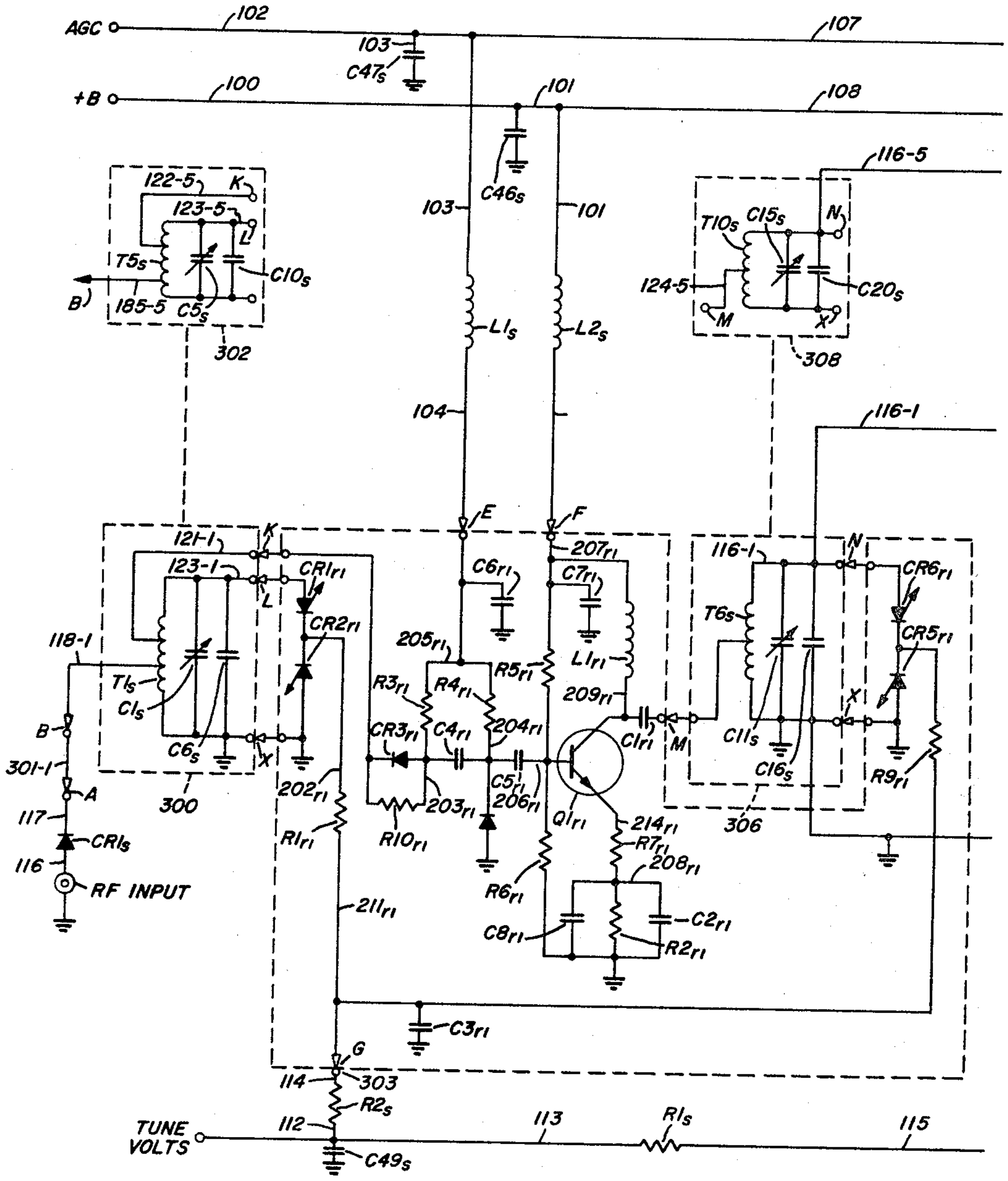
Figure 14:
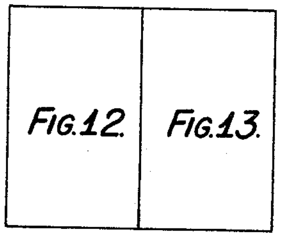
Figure 13:
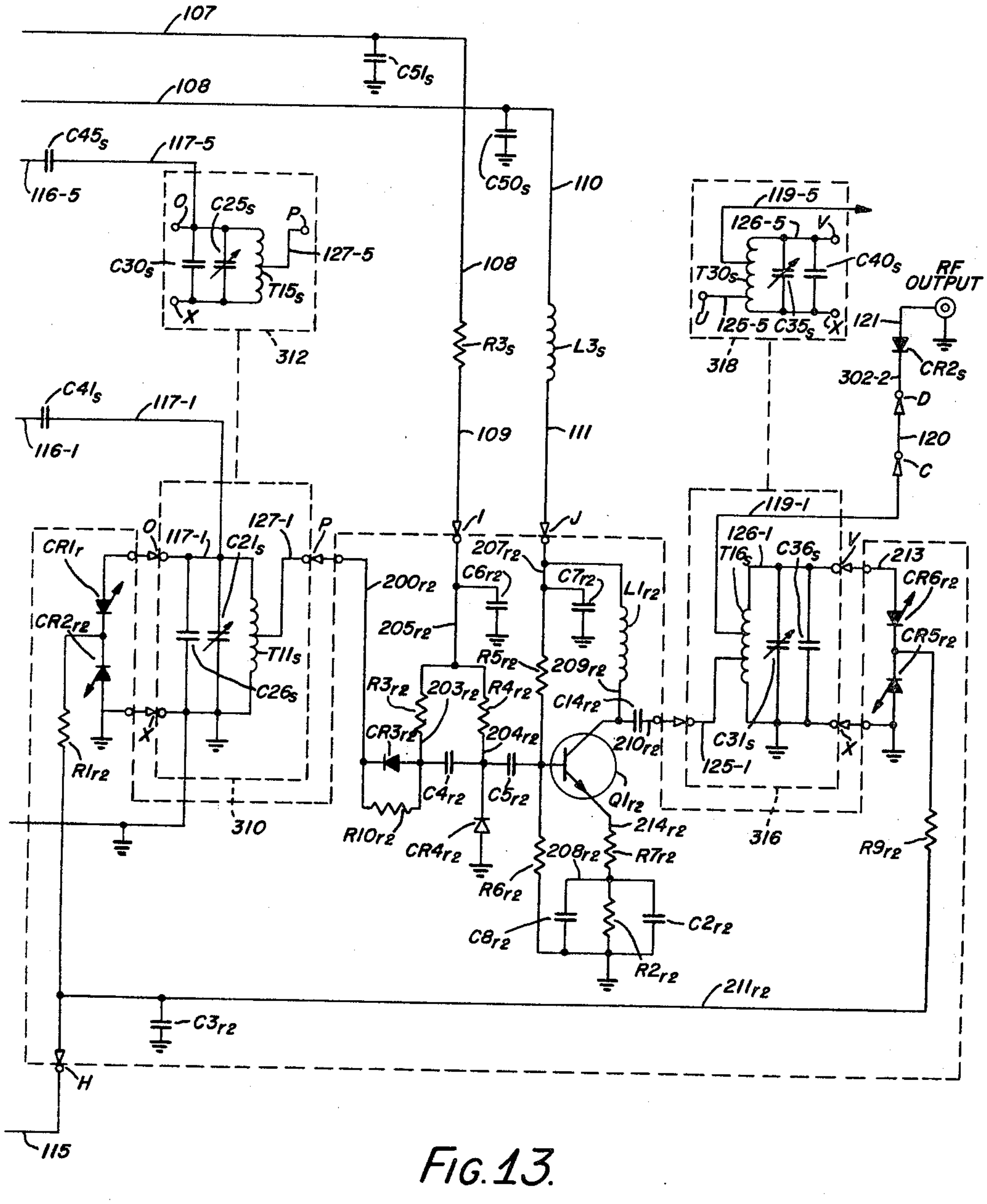

FIGS. 12 and 13 taken together as shown in FIG. 14 is a schematic diagram of the circuit of the amplifier-tuner.

Figure 1:
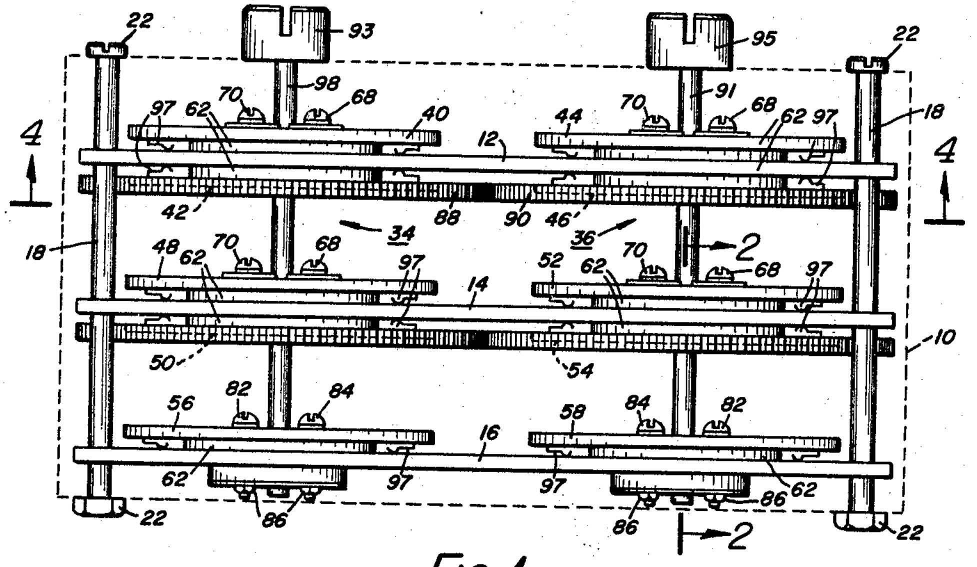
FIG. 1 is a front view of an amplifier-tuner embodying the invention, in which the electrical components are removed to simplify and clarify the illustration.
Figure 4:
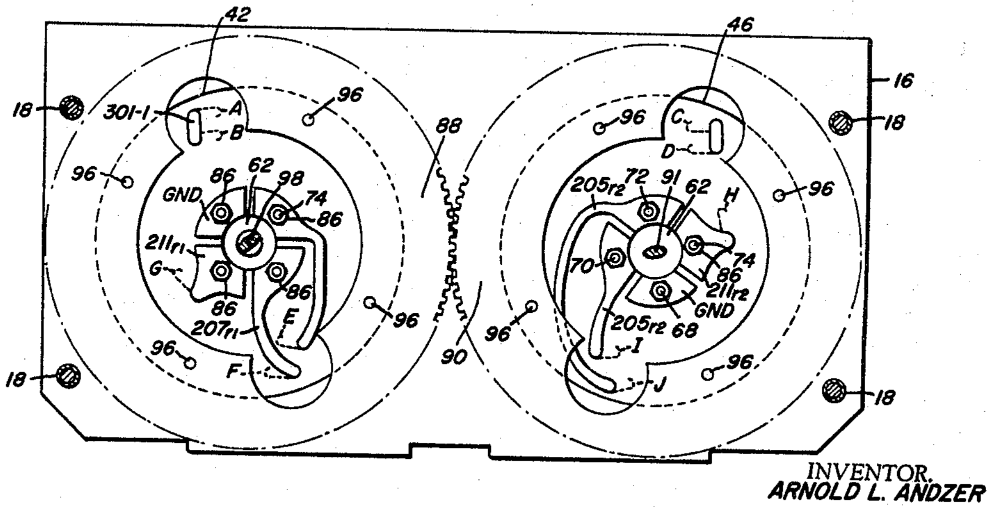
FIG. 4 is a sectional view of the tuner taken along the line 4—4 of FIG. 1.
Figure 5:
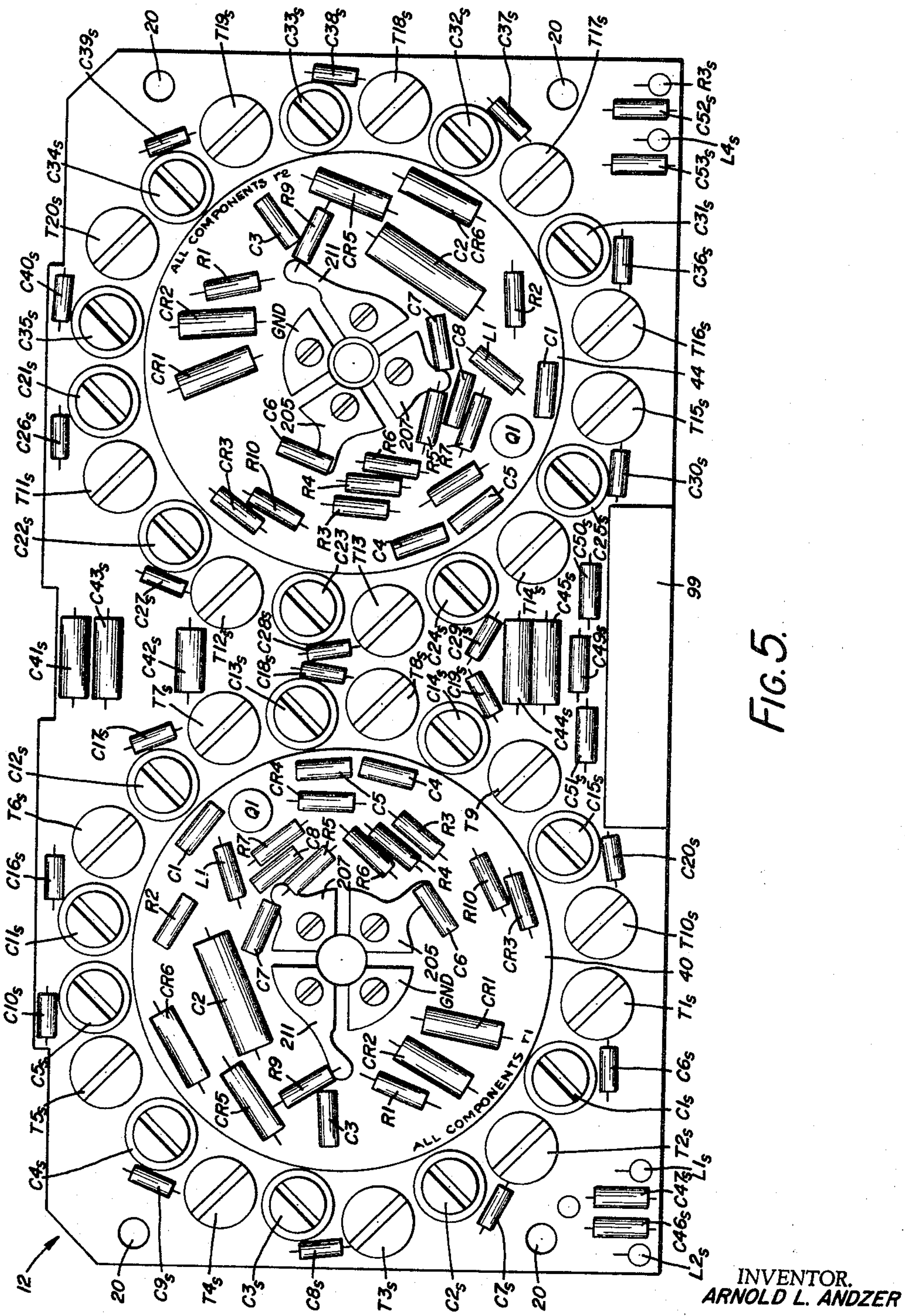
FIG. 5 is a top view of the tuner shown in FIG. 1, with the components in place but with much of the printed wiring deleted.
Figure 10:
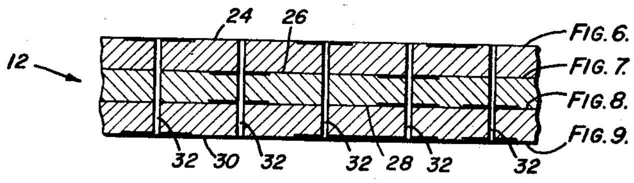
FIG. 10 is a fragmentary diagrammatic sectional view of the stator board.
Figure 11:
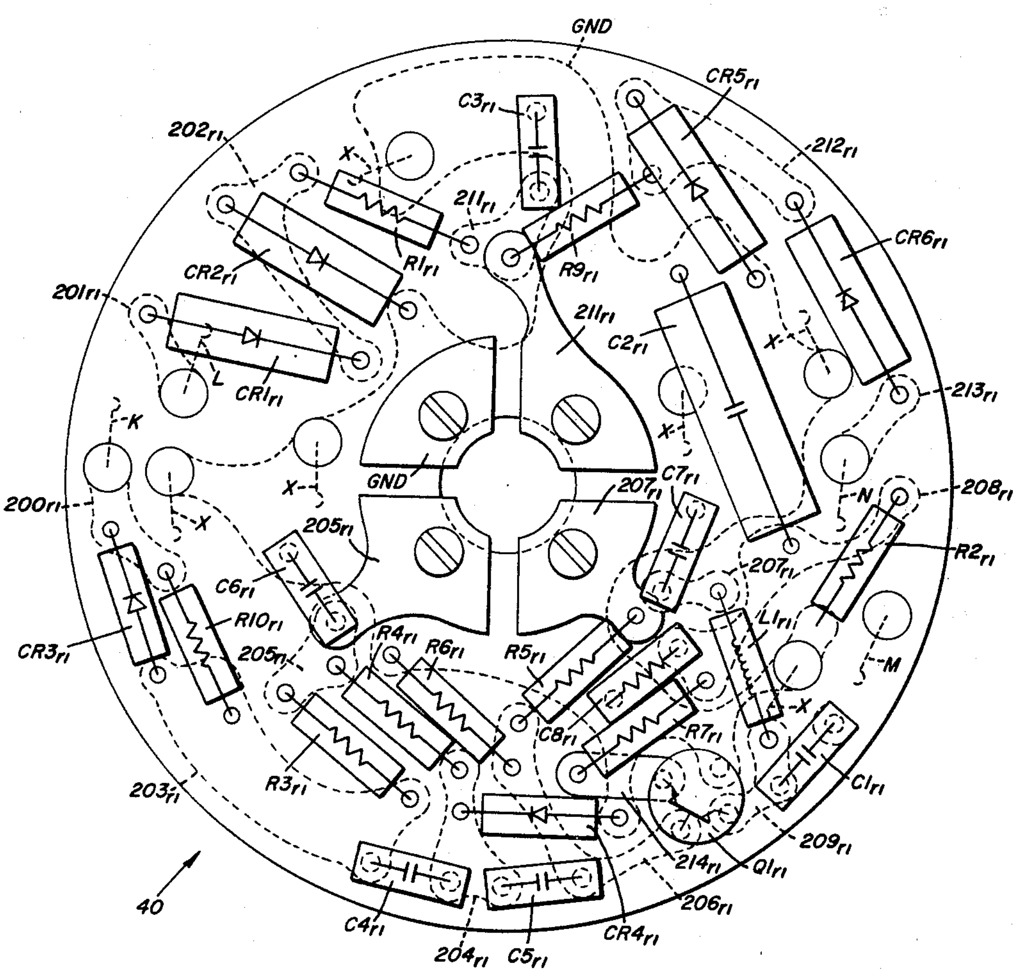
FIG. 11 is a top view of the rotor board.

Referring specifically to FIGS. 1–5, there is shown a tuner amplifier embodying the invention which is designed to cover the band from 2 to 76 mc./s. continuously in 1 kc./s. steps. Vernier adjustment between the 1 kc. steps may also be provided. As shown in FIG. 1, the tuner amplifier may be of modular construtcion and contained in a box 10 indicated by the dash lines. Three printed circuit stator boards 12, 14 and 16 are arranged in spaced relationship on four mounting posts 18 which are located near the corners of the stator boards. The posts may be constructed of rods which penetrate holes in the stator boards (the holes 20 are shown in FIG. 5). Spacer tubes are disposed around the rods between the boards 12, 14 and 16 and above and below the top and bottom boards 12 and 16. The ends of the rods within the posts 18 may be threaded to provide facility for receiving nuts 22 which fasten the assembly in the box 10. The printed circuit boards 12, 14 and 16 are multilayer (viz four layer) printed circuit boards, as diagrammatically represented by the sectional view through the board 12 in FIG. 10.

The upper 24, first middle 26, second middle 28, and bottom 30 layers of the board are shown in detail in FIGS. 6, 7, 8 and 9, respectively. The layers are interconnected by holes 32 which penetrate the board 12. These holes 32 are coated with conductive material which provides connections between the printed circuit portions on the various layers, and are termed "plated through holes." Of course, no contact is made where the board is not printed in the area of a hole.

Figure 2:
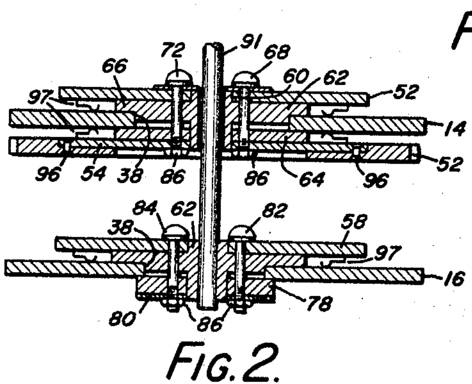
FIG. 2 is a sectional view taken along the line 2—2 of FIG. 1.
Figure 3:
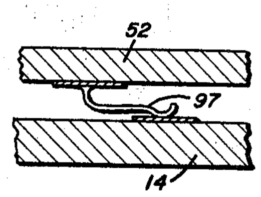
FIG. 3 is a fragmentary, enlarged sectional view showing a contact element of the tuner shown in FIGS. 1 and 2.

The boards 12, 14 and 16 also have a pair of holes 38 in which rotatable assemblies 34 and 36 including printed circuit rotor boards 40, 42, 44, 46, 48, 50, 52, 54, 56 and 58 may be journaled. The arrangement of the rotor and stator boards and the holes 38 through the stator boards will be more clearly apparent from FIG. 2. The rotor boards 40, 42, 44, 46, 48, 50, 52, 54, 56 and 58 are each disks having printed circuits on the top and bottom surfaces thereof. The rotor boards also have a central aperture 60 which receives hubs 62 that are journaled for rotation in the holes 38 in the stator boards 12, 14 and 16 (see FIG. 2). A spacer disk 64 of insulating material is sandwiched between the top and middle stator boards 12 and 14 and the bottom rotor boards 42, 46, 50 and 54 (see for example FIG. 2). As shown in FIG. 2, the stator board 14, the top and bottom rotor boards 52 and 54, and the spacer disk 64 are sandwiched, together with an enlarged portion 66 of the hub 62, by means of bolts 68, 70, 72 and 74, and their associated nuts 76. The bolts provide conductive connections between the rotor boards through the hubs 62, thereby facilitating the miniturization of the tuner amplifier.

The other pairs of rotor boards, which are disposed adjacent to opposite sides of the stator boards 12 and 14 (viz rotor boards 40, 42, 44, 46, 48 and 50) may be assembled in sandwiched relationship with the stator boards and the hubs in a manner similar to that shown for the rotor boards 52 and 54 in FIG. 2.

The rotor boards 56 and 58, which are disposed adjacent to the bottom stator board 16, may be fastened to their hubs 62, also as shown in FIG. 2. A disk 78 of insulating material, which is plated with a conductor 80, provides the bottom of the sandwich arrangement for the rotor boards 56 and 58, and the stator board 16. Bolts 82 and 84 and two others bolts, not shown, together with their associated nuts 86 fasten the sandwich assembly of the boards 56, 58 and 16 together. These bolts also provide for conductive connections between different printed circuit portions of the rotor boards 56 and 58, as is the case for the bolts 68, 70, 72 and 74.

As shown in FIGS. 2 and 4, pairs of gears 88 and 90, and 92 and 94 form parts of the rotatable assemblies 34 and 36. The gears 88 and 90 are respectively fastened to the bottom rotor boards 42 and 46 by means of rivets 96. The gears 88, 90, 92 and 94 are made of insulating material, such as nylon.

Since the gears are fastened by way of the bolts and rivets to the rotatable pairs of rotor boards (e.g. the gear 90 and the boards 54 and 56 shown in FIG. 2), rotation of the gear 90 will cause both of the rotor boards to rotate. Rotation of the gear 90 will rotate the gear 88 and therefore the pair of rotor boards 40 and 42, which are assembled therewith will rotate with the gear 88.

In order to selectively rotate the pairs of rotor boards, a pair of shafts 98 and 91, which respectively form parts of the rotating assemblies 34 and 36, are provided. These shafts have flattened sides and are effectively keyed only to those rotor board units which have similarly shaped holes (viz holes with flattened sides). Each of the hubs 60 have holes therethrough. However, different ones of the hubs which are journaled in the same rotor board are shaped so as to rotate with only one of the shafts 98 and 91 extending therethrough, except in the case of the bottom units containing the rotor boards 56 and 58 which are keyed to rotate with their respective shafts 98 and 91 (see FIG. 2). Specifically, the hub 62 of the unit including the rotor boards 40 and 42 has a round hole so that the flattened shaft 98 does not rotate that rotor board unit. The rotor board unit including the boards 40 and 42 are, however, rotated by means of the gear 88. The shaft 91 is keyed to the hub of the unit including the rotor boards 44 and 46. Therefore, the shaft 91 rotates both the rotor board unit including the boards 44 and 46, and the rotor board unit including the boards 40 and 42.

As shown in FIG. 2, the shaft 91 is not keyed to the rotor board unit which cooperates with the middle stator board 14. The rotor board unit including the boards 48 and 50 is, however, keyed to the shaft 98. Therefore, when the shaft 98 is rotated, the rotor board unit, which cooperates with the middle stator board 14, rotates. The shaft 91 causes the rotation of both rotor board units associated with the top stator board 12.

Slotted couplings 93 and 95, respectively connected to the upper ends of the shafts 98 and 91, are provided for connection to a step drive (not shown) for rotoating these units over predetermined arcuate sectors (viz of 36°, inasmuch as ten different tuned circuits may be connected to the amplifier circuits on the rotor boards in this embodiment of the amplifier tuner). This step drive may be a gear mechanism coupled to four detented knobs which respectively rotate the rotor board units to different positions depending upon the position thereof. These knobs may respectively control the 10 mc./s., 1 mc./s., 100 kc./s., 10 kc./s., and 1 kc./s. tuning steps to which the tuner amplifier may be adjusted. The 1 kc./s. steps may be selected by a 1 kc./s. knob which controls the operation of a frequency synthesizer in the radio which makes use of this tuner amplifier. Inasmuch as the design of such gear mechanism is known in the art, it will not be mentioned in detail herein. A gear mechanism, say utilizing segmental gears which are responsive to the rotation of the 10 mc./s., and 1 mc./s. knobs facilitates digital tuning of the tuner amplifier and may be more desirable than manual adjustment of the shafts 98 and 100. Of course, the shafts 98 and 91 may be adjusted manually to different positions in order to tune the unit to different frequencies; this rotation being accomplished in accordance with a predetermined schedule.

The printed circuits on the rotor boards and the printed circuits on the stator boards are selectably interconnected by means of contact elements 97, some of which extend from the bottom printed third circuit layer of the rotor boards 40, 44, 48, 50, 56 and 58 to their respective stator boards and some of which extend upwardly from the rotor boards 42, 46, 50 and 54 to respective stator boards. As shown in greater detail in FIGS. 2 and 3, the contact elements 97 are wires of yieldable material, such as beryllium copper alloy which are anchored at one end, as by soldering, to printed circuit portions of the rotor boards on which they are mounted. The free ends of the contact elements 97 are U shaped so as to ride on the printed circuit portions of the stator boards with which they cooperate. The location of the contact elements in the case of the rotor boards 42 and 46 is indicated in FIG. 4. These contact elements are designated by capital letters A through X in order to identify them in connection with the circuit arrangement provided on the rotor boards 40, 42, 44 and 46, which cooperate with the stator board 12 (see also FIG. 12).

FIG. 4 shows how the contact elements are connected to printed circuit portions on the bottom layer of the rotor boards 42 and 46. By way of plated through holes in these boards, the contact elements are connected to other printed circuit portions thereof. These printed circuit portions are contacted by different ones of the bolts 68, 70, 72, and 74 which also connect elements 97 to various printed circuit portions on the upper surface of the top rotor boards 40 and 44.

Connections from the tuner amplifier to other circuits, say of the radio set which incorporates the tuner amplifier, is provided by way of a female connector 99 (see FIG. 5). This connector is cooperative with a male connector (not shown) and is operative to supply the tuner amplifier with operating voltages, input signals, tuning voltages, ground connections, and to derive output signals from the tuner amplifier.

A pair of coupled RF amplifier circuits are provided by the stator board 12 and its cooperating pairs of rotor boards (viz pair 40 and 42 and pair 44 and 46). Similarly, the stator board 14 and its two pairs of rotor boards 46, 50 and 52, 54 provide an additional pair of coupled RF amplifiers. The stator board 16 and its cooperating rotor boards 56 and 58 may provide oscillator circuits. The active components, such as transistors and variable capacitor diodes, of the oscillator circuits are disposed on the rotor boards 56 and 58, while the tank circuits of these oscillators are mounted on the stator board 16. The components of the circuits, such as transformers (T1 to T20) and the capacitors (C1 to C40) which cooperate therewith to provide tank circuits are mounted on the stator board 12, as shown in FIG. 5. The transistors Q1, variable capacitor diodes CR1, CR2, CR5 and CR6 are mounted on the rotor boards, all as shown in FIG. 5.

Figure 6:
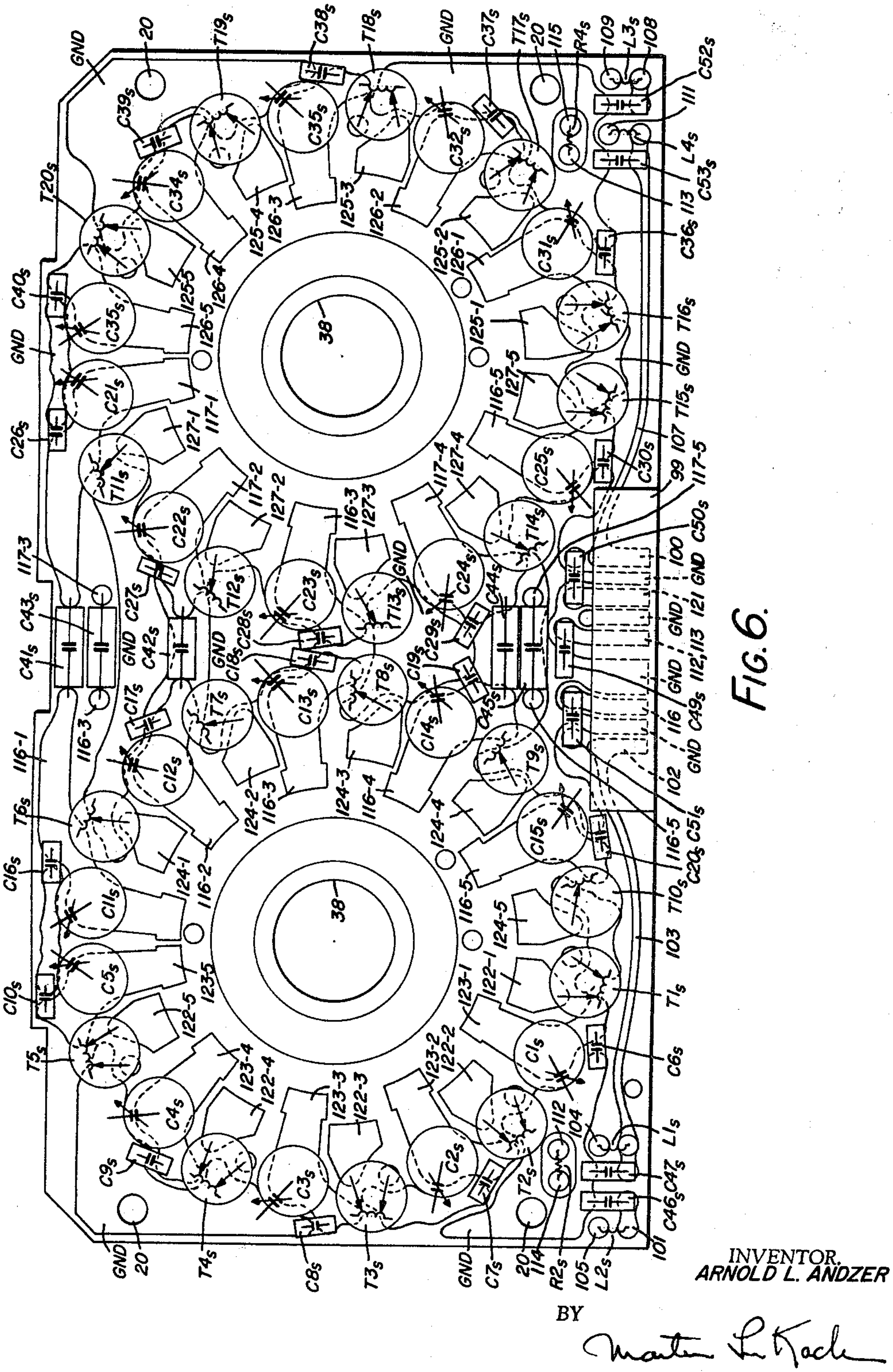
FIGS. 6, 7 and 8 are top views of the upper, first internal and second internal layers of the stator board.
Figure 7:
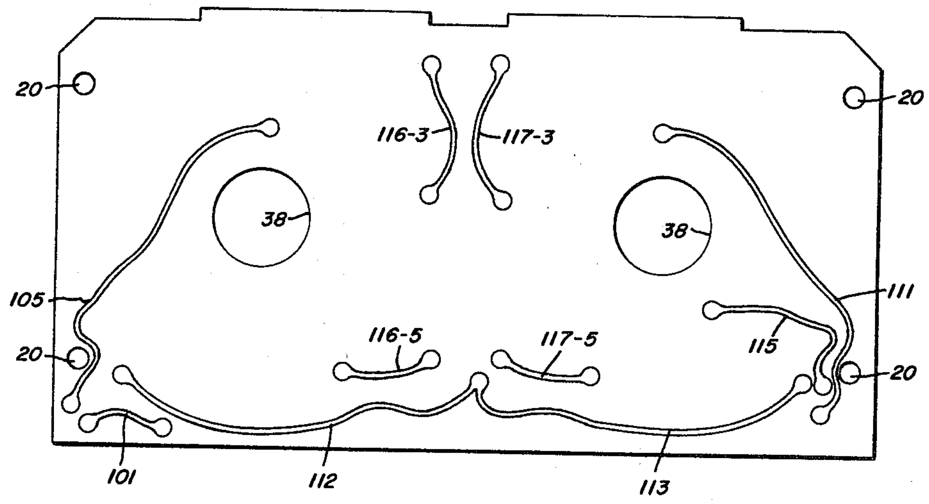
Figure 8:
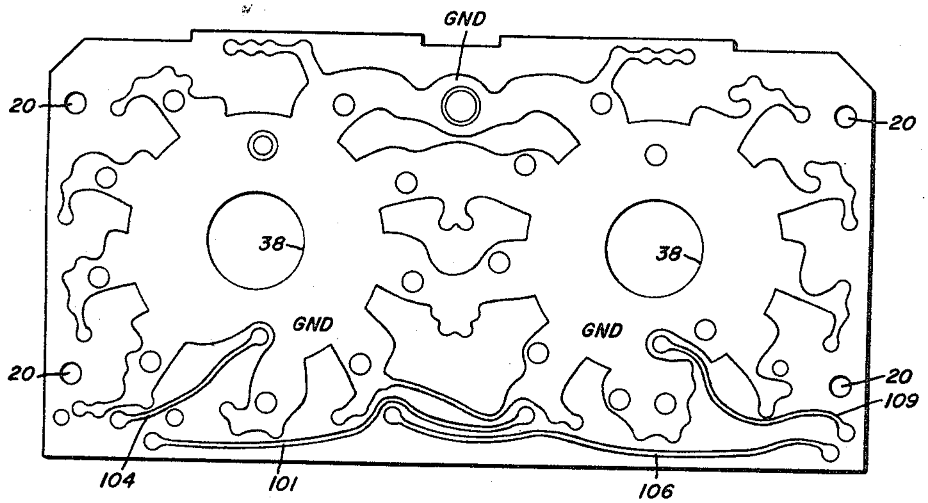
Figure 9:
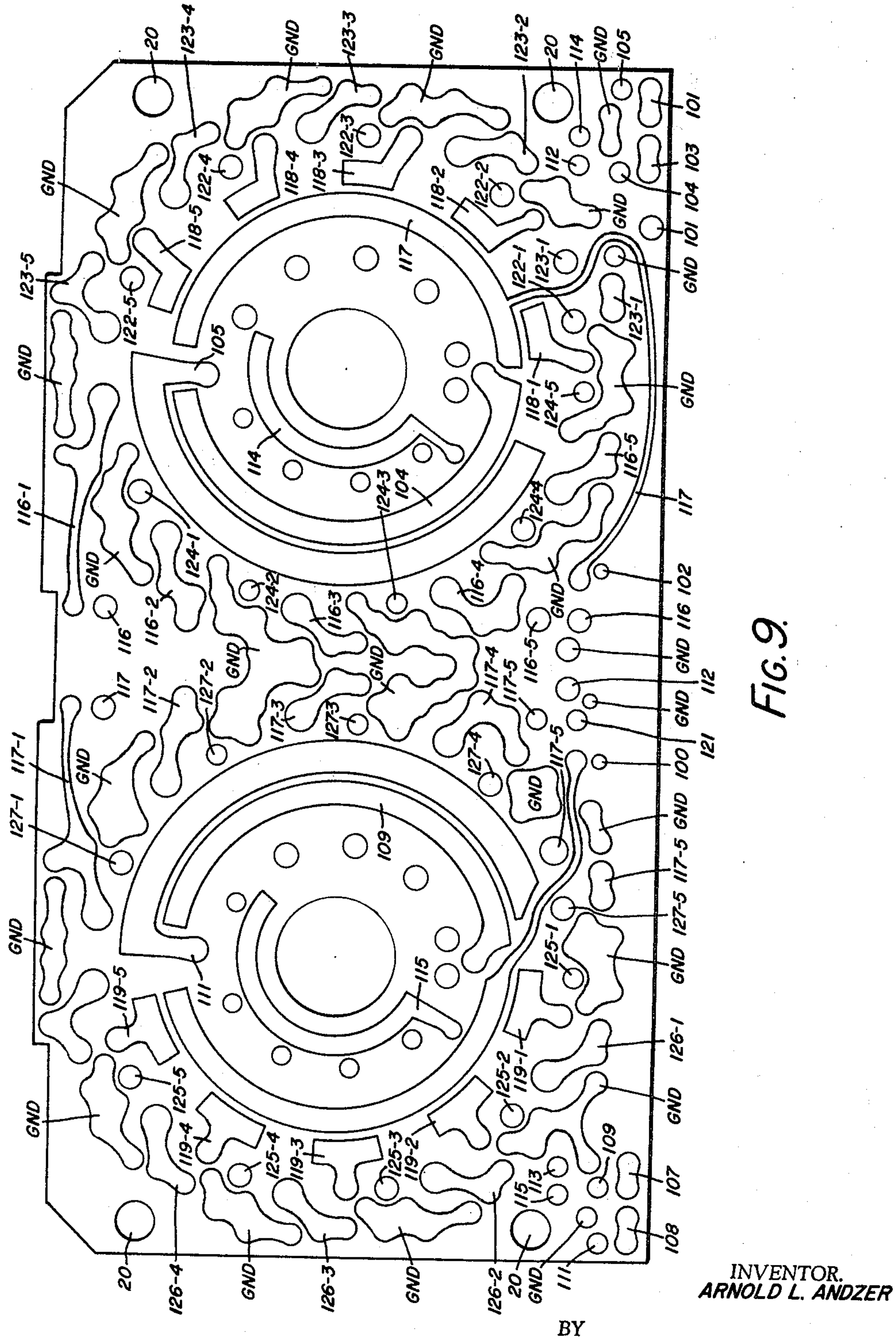
FIG. 9 is a bottom view of the bottom layer of the stator board.

The circuits of the RF amplifiers, which are provided by virtue of the components and printed circuit connections on the stator board 12 and its associated rotor boards 40, 42, 44 and 46, are shown in FIG. 12. The components of the amplifier which are associated with the rotor boards 40 and 42 are identified by the subscript $r_1$, while the components of the amplifier associated with the rotor boards 44 and 46 are identified by the subscript $r_2$. The connections provided by the printed circuit portions are identified by numbers also having subscripts $r_1$ or $r_2$ depending upon whether they are associated with the rotor boards 40 and 42, or 44 and 46. The connections and components of the stator board are identified by the subscript *s*. As previously indicated, the contact elements are identified with alphabetic notations (viz A through X). The letter X is used in common for all ground contact elements. The printed circuit connections are provided on the top layer of the stator board 12, as shown in FIG. 6, the first middle layer, as shown in FIG. 7; the second middle layer as shown in FIG. 8 (it will be noted that this second middle layer is utilized for common ground connections and provides shielding between the various layers, thus reducing coupling and improving the noise response of the tuner amplifier) and on the bottom layer, as shown in FIG. 9. Reference should be had to FIGS. 6–9 for the location of the printed circuit connections as the description of the circuit proceeds.

Signals from the antenna in the case of a receiver or from a translator in the case of an exciter, are applied to an RF input terminal and coupled by way of a diode CR1*s* to any one of five input tank circuits, only the first and the last 300 and 302 thereof are shown in FIG. 12. Each tank circuit is tuned to a different frequency and includes a different one of the inductors T1*s* to T5*s*. The appropriate circuit 300 to 302 is connected to the RF input by means of contact elements A and B. A radio frequency amplifier circuit 304, including the transistor Q1$r_1$ and the variable capacity diodes CR1*r*, CR2$r_1$, in its input circuit and CR5$r_1$ and CR6$r_1$, in its output circuit is mounted on the rotor board 40. Operating voltages from a source indicated at +B is connected to the transistor Q1$r_1$ by way of contact element F. Gain control voltages from an AGC generator circuit in the radio set are connected to the amplifier by way of contact element E. Tuning voltages for tuning the variable capacity diodes are connected to the amplifier by way of contact element G. The circuits for generating the AGC voltage and the tuning voltage, as may be contained in the radio set may be circuits of the type described in U.S. patents, Nos. 3,061,742 and 3,249,876.

The output coupling network of the amplifier 304 may include any one of five tank circuits, only the first and last of which 306 and 308 are shown in FIGS. 12 and 13. These tank circuits may be connected to the collector circuit of the transistor Q1$r_1$ amplifier 304 by way of contact elements M, N and X. The input tank circuits 300 to 302 may similarly be connected to the input circuits or the amplifier by way of contact elements K, L and X. Five tank circuits, only two of which, 310 and 312 are illustrated in FIG. 12 are mounted on the stator board 12 and provide both input tuned circuits to the second amplifier 314 which is mounted on the rotor board 44 and the second half of the doubled tuned coupling circuit between the amplifier stages 304 and 314. Capacitors C41*s* and C45*s* couple the tank circuits 306 and 310 and 308 and 312 and the tank circuit C41*s* is mounted on the stator board 12, as shown in FIG. 6. The others of the five tank circuits (not shown) are similarly coupled by other capacitors.

Contact elements O, P and X selectively connect the tuned circuits 310 to 312 to the amplifier 314. Five output tuned circuits, the first and last of which 316 and 318 are shown in FIG. 12 are also selectively connected to the output of the amplifier 304 by way of contact elements U, V and X. It will be observed that the amplifiers 304 and 314 are identical. The amplifier 314 receives operating voltages from the source at B+ by way of contact elements J. AGC voltages and tuning voltages are applied to the amplifier 314 by way of contact elements I and H respectively.

Output voltages are applied to an RF output terminal from the tank circuits 316 to 318 by way of contact elements C and D via a diode CR2*s*. The diodes CR1*s* at the RF input terminal and CR2*s* at the output terminal may be connected to bias circuits for the purpose of back biasing these diodes when the RF amplifiers which are associated with the middle stator board 14 are used rather than the RF amplifier associated with the top stator board 12 (viz the RF amplifier illustrated in FIG. 12).

From the foregoing description it will be apparent that there has been provided an improved tuner amplifier which is especially suitable for use in radio sets designed to operate over an extremely wide frequency band. The tuner amplifier arrangement is particularly suitable for miniaturization and may occupy, for example, a volume of about 20 cubic inches. While the foregoing description has specifically discussed the use of four layer printed circuit boards and two layer rotor boards, it will be appreciated that different combinations of multi-layer boards may be used in a tuner amplifier embodying the invention. It will further be appreciated that a tuner amplifier embodying the invention may use more or less than three stator boards and their associated rotor boards as is the case for the herein illustrated tuner amplifier. Other variations and modifications within the scope of the invention will, undoubtedly suggest themselves to those skilled in the art. Accordingly, the foregoing descriptions should be taken merely as illustrative and not in any limiting sense.

What is claimed is:

1. A radio frequency amplifier and tuner for a multiband radio which comprises:

(a) a plurality of multilayer printed circuit stator boards disposed in stacked relationship with respect to each other, each of said stator boards having a plurality of tuned circuits corresponding to different ones of said bands mounted thereon, connectors mounted on said boards connected to said printed circuits for applying input signals and operating voltages to said amplifier and for deriving output signals therefrom, (b) a plurality of printed circuit rotor boards, separate pairs of said rotor boards being disposed adjacent opposite sides of different ones of said stator boards, and being journaled therein on hubs for rotation with respect to said stator boards, (c) conductor elements extending through said hubs for interconnecting the printed circuits on each of said separate pairs of rotor boards, (d) an active circuit cooperable with said tuned circuits mounted on at least one of the rotor boards of each of said separate pairs of rotor boards, (e) a plurality of contact elements extending from each of said rotor boards to the sides of said stator boards adjacent thereto, (f) said stator boards having a plurality of printed circuit portions disposed for engagement by said contact elements when said rotor boards rotate with respect to said stator board to selectively connect said different tuned circuits to said active circuits and to selectively apply said operating voltages to said amplifier circuits so as to provide radio frequency amplifier circuits operative in said plurality of bands, and (g) a tuning shaft extending through said hubs and coupled to said rotor boards for rotating said boards.

2. The invention set forth in claim 1, wherin second pairs of rotor boards are mounted in side-by-side relationship to each of said separate pairs of rotor boards set forth in claim 1, each board of said second pairs of rotor boards being disposed adjacent to opposite sides of different ones of said stator boards and having hubs rotatably mounting said second pairs of rotor boards in the stator boards adjacent thereto, said second rotor boards also having the elements set forth in subparagraphs (d) and (e) of claim 1, and said stator boards having printed circuit portions disposed for engagement with the second rotor board contact elements, a second shaft extending through the second rotor board hubs, and first gears coupled to one rotor board of said separate rotor board pairs and second gears intermeshing with said first gears couple to at least one rotor board of said second rotor board pairs so that rotor board pairs adjacent to the same stator board rotate with each other, and means for keying said first mentioned shaft and said second shaft to said first and second rotor board pairs which are adjacent different ones of said stator boards.

3. The invention as set forth in claim 1, wherein each of said stator boards has four printed circuit layers, an intermediate one of which provides a common ground and is connectible to one of said conductor elements of said rotor boards cooperating therewith.

4. The invention as set forth in claim 1, wherein the active circuit on said rotor board includes a voltage variable capacitor, and wherein said stator boards each include a printed circuit path between one of said rotor board contact elements and one of said conductor elements, and a printed circuit path on said rotor board to said voltage variable capacitor.

5. The invention as set forth in claim 1, wherein said contact elements each comprise a flexible wire attached at one end to a printed circuit portion of its associated rotor board.

6. The invention as set forth in claim 2, wherein said active circuit includes transistors and wherein said radio frequency amplifier comprises AGC circuits connected to said transistors, different ones of said tuned circuits being connected by way of said contact elements and the printed circuits on said rotor and stator boards to said transistors to tune said RF amplifier to different ones of said plurality of bands.

7. A tuner comprising:

(a) an amplifier circuit including a plurality of components, (b) a plurality of circuits each tuned to a different frequency band, (c) a first printed circuit board on which said tuned circuits are disposed, said first braod having printed circuit connections for said tuned circuits including printed circuit input and output terminal connections for said tuned circuits, (d) a second printed circuit board mounted in a plane parallel to the plane of said first board for rotation with respect to said first board, said second board having said amplifier circuit components mounted on one side thereof, and having printed circuit connections among said components on at least the opposite side thereof, said opposite side being opposed to said first board input and output connections, and (e) a plurality of contact elements extending from said opposite side of said first board for contacting different groups of said input and output connections in accordance with the rotational position of said first and second boards with respect to each other.

8. The invention as set forth in claim 7, wherein said first board has holes therein which are axially aligned with each other, a hub in said first board hole and rotatably mounted therein, said second board being attached to said bushing for rotation therewith.

9. The invention as set forth in claim 8, wherein a third printed circuit board is rotatably mounted on said hub facing the side of said first board opposite to the side thereof faced by said second board, said opposite side of said first board having printed circuit connections for applying operating voltages and control voltages to said amplifier circuit, said last-named connections having terminals opposed to the side of said third board in facing relationship therewith, contact elements mounted on said third board for engaging said last-named terminals, said hubs having conductive elements therethrough, printed circuit connections between said third board contact elements and said conductive elements, and between said second board components and said conductive elements.

References Cited

UNITED STATES PATENTS

| | | | |
|---|---|---|---|
| 2,759,098 | 8/1956 | White et al. | 334—49 |
| 3,351,816 | 11/1967 | Sear et al. | |
| 3,356,972 | 12/1967 | Rieth. | |

WILLIAM C. COOPER, *Primary Examiner.*

CHARLES JIRAUCH, *Assistant Examiner.*

U.S. Cl. X.R.

334—49